United States Patent [19]

Lu et al.

[11] Patent Number: 5,331,544
[45] Date of Patent: Jul. 19, 1994

[54] MARKET RESEARCH METHOD AND SYSTEM FOR COLLECTING RETAIL STORE AND SHOPPER MARKET RESEARCH DATA

[75] Inventors: Daozheng Lu, Buffalo Grove, Ill.; David A. Kiewit, Palm Harbor, Fla.; Jia Zhang, Mundelein, Ill.

[73] Assignee: A. C. Nielsen Company, Northbrook, Ill.

[21] Appl. No.: 872,881

[22] Filed: Apr. 23, 1992

[51] Int. Cl.$^5$ .............................. G06F 15/21
[52] U.S. Cl. .................................. 364/401
[58] Field of Search .............. 364/401, 402; 382/2, 382/57

[56] References Cited

U.S. PATENT DOCUMENTS

| | | | |
|---|---|---|---|
| 3,816,842 | 6/1974 | Glaros et al. | 95/31 R |
| 4,206,441 | 6/1980 | Kondo | 340/146.3 |
| 4,331,973 | 5/1982 | Eskin | 358/84 |
| 4,449,189 | 5/1984 | Feix et al. | 364/513.5 |
| 4,641,349 | 2/1987 | Flom et al. | 382/2 |
| 4,712,103 | 12/1987 | Gotanda | 340/825.31 |
| 4,811,408 | 5/1989 | Goldman | 382/2 |
| 4,858,000 | 8/1989 | Lu | 358/84 |
| 4,872,113 | 10/1989 | Dinerstein | 364/401 |
| 4,930,011 | 5/1990 | Kiewit | 358/84 |
| 4,972,504 | 11/1990 | Daniel | 455/2 |
| 4,975,969 | 12/1990 | Tal | 382/2 |
| 5,031,228 | 7/1991 | Lu | 382/38 |
| 5,056,019 | 10/1991 | Schultz et al. | 364/405 |

OTHER PUBLICATIONS

R. C. Gonzales and P. Wintz, "Digital Image Processing." 2nd ed., Addison and Wesley Publishing Company, 1987.

L. Strovich and M. Kirby, "Low Dimensional Procedure for the Characterization of Human Faces." J. Optical Society of America A, vol. 4, No. 3, pp. 519-524, 1987.

M. Kirby et al., "Application of the Karhuen-Loeve Procedure for the Characterization of the Human Face" Transactions on Pattern Analysis and Machine Intelligence., vol. 12, No. 1, 1990.

M. Turk et al. "Eigenfaces for Recognition." Journal of Cognitive Neuroscience, vol. 3, No. 1, pp. 71-86, 1991.

*Primary Examiner*—Roy N. Envall, Jr.
*Assistant Examiner*—Ari M. Bai
*Attorney, Agent, or Firm*—Marshall, O'Toole, Gerstein, Murray & Borun

[57] ABSTRACT

A market research system and method are provided. A plurality of cooperating establishments are included in a market research test area. Each cooperating establishment is adapted for collecting and storing market research data. A computer system remotely located from the plurality of cooperating establishments stores market research data collected from the cooperating establishments. The collected market research data includes monitored retail sales transactions and captured video images of retail customers.

22 Claims, 5 Drawing Sheets

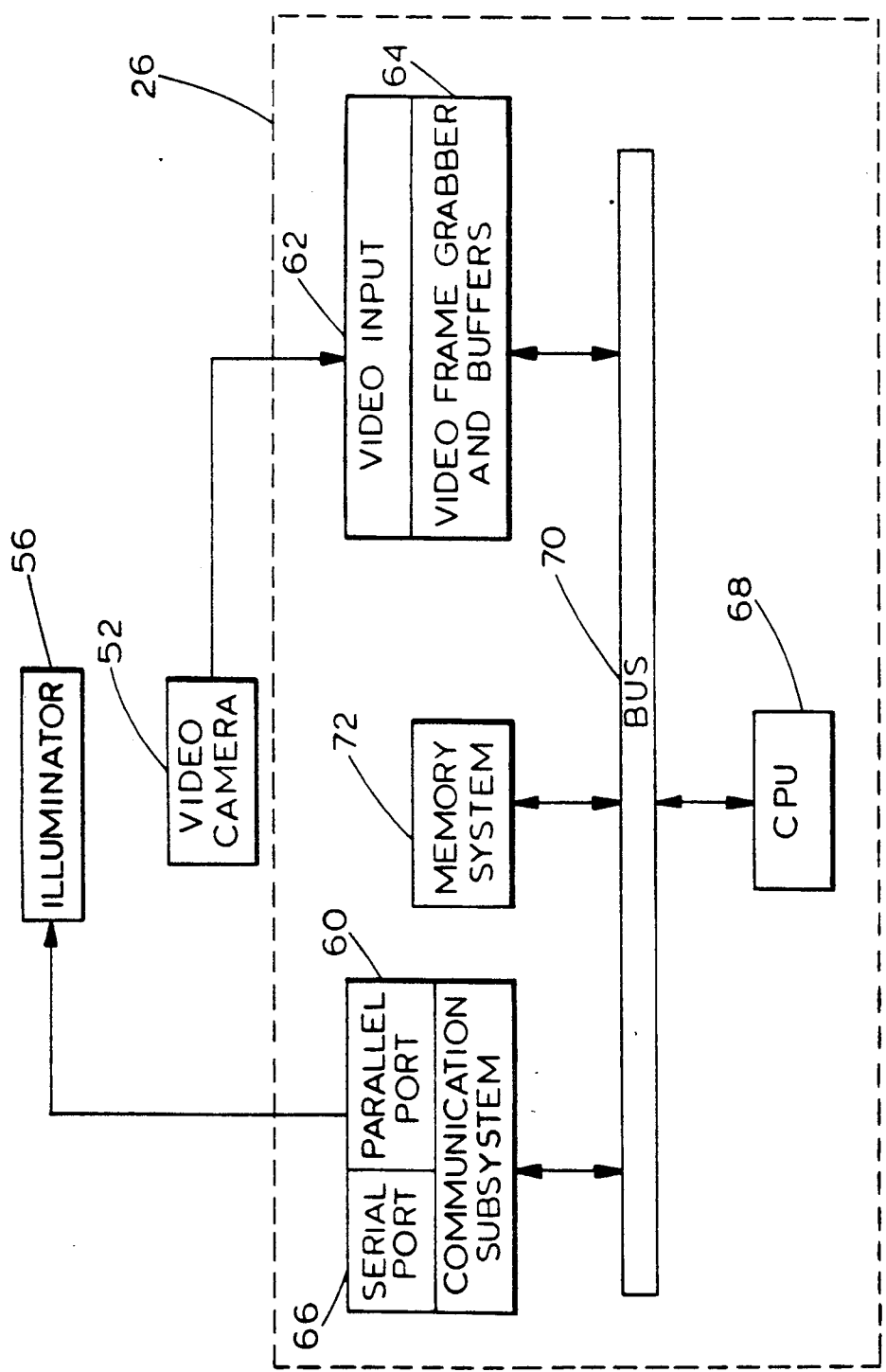

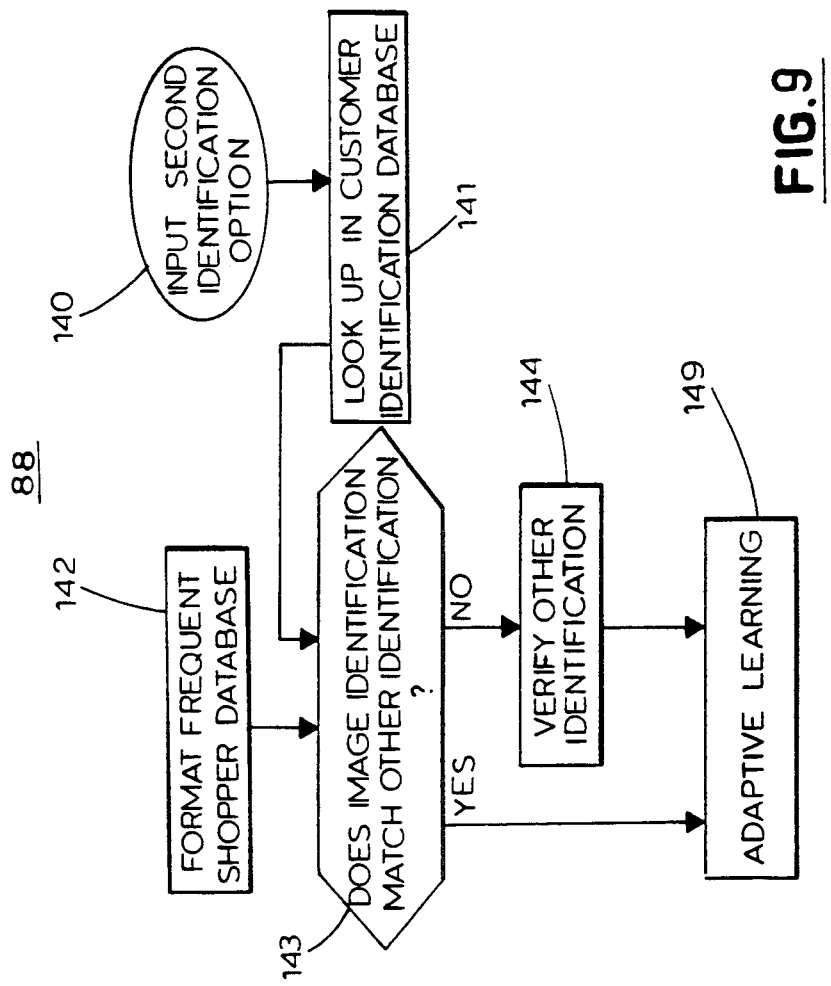
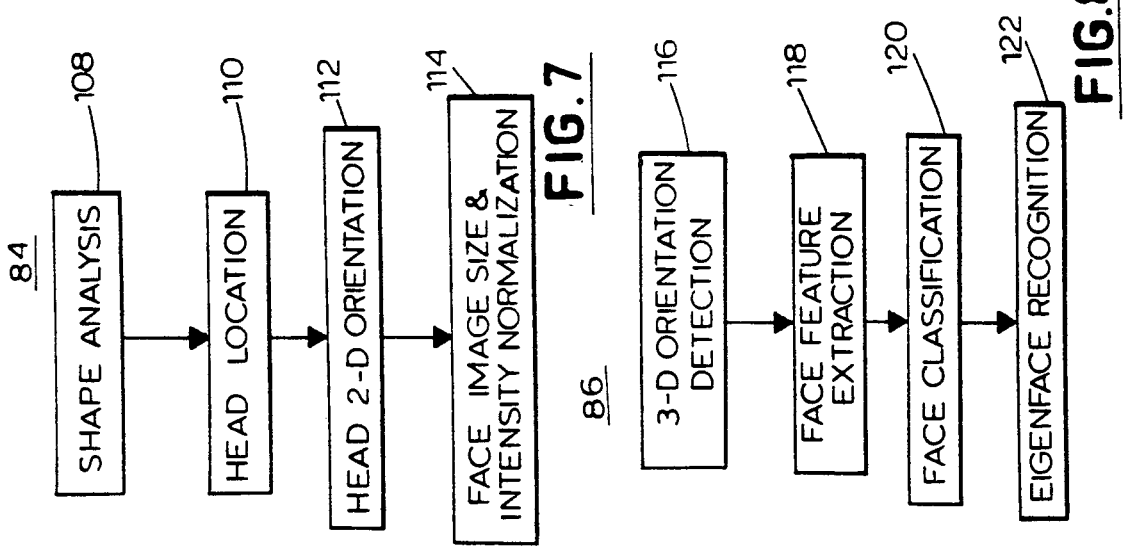

MARKET RESEARCH METHOD AND SYSTEM FOR COLLECTING RETAIL STORE AND SHOPPER MARKET RESEARCH DATA

BACKGROUND OF THE INVENTION

1. Field of the Invention

The present invention relates to systems and methods for the collection of market research data from a plurality of cooperating retail stores.

2. Description of the Prior Art

Various arrangements have been employed for the collection, summarization and forwarding of Point-Of-Sale purchasing information from retail stores for purposes of market research since the advent of Point-Of-Sale (POS) optical scanners and the widespread use of the Universal Product Code (UPC) to identify retail products. Typically, retail purchase data is summarized by an in-store POS controller or by a separate store computer attached to the POS controller in the store or, if the store is part of a large retail store chain, by a central or host computer at the headquarters of the retail store chain. The summarized retail purchase data is then typically forwarded to the users of the data by any one of a number of different data storage and transmission techniques, for example, by magnetic tape or disk or diskette or by telephonic data transmission or by over-the-air data transmission.

For example Daniel Jr., et al., U.S. Pat. No. 4,972,504 issued Nov. 20, 1990 and assigned to the present assignee, discloses a marketing research system and method for obtaining retail data on a real time basis.

The identification of frequent shoppers and analysis of their purchases can be important to retailers since frequent shoppers may be the most valuable of customers. In order to determine what steps might increase the loyalty of frequent shoppers, a retailer may wish to study the distribution of times between visits of frequent shoppers and average purchase amount for frequent shoppers as compared to infrequent shoppers. Market research studies of frequent shopper behavior may also be of interest to packaged goods manufacturers and advertising agencies.

To date technological limitations on identifying people for in-store market research studies have dictated the use of identification methods that both require a high degree of cooperation and that incidentally provide unique identification, such as identification cards that are issued to cooperating panelists and that can be read by barcode-reading equipment installed in a grocery store checkout counter. For example, a panelist study is disclosed by Eskin et al., U.S. Pat. No. 4,331,973. Other studies have used panels of cooperating shoppers who paid for their purchases with personal checks and automatic check-reading equipment, of the sort commonly used in banking, was used at the point of sale to read the panelist's bank account number and to identify the panelist.

Another method and apparatus for identifying individual members of a marketing and viewing audience are taught by David A. Kiewit U.S. Pat. No. 4,930,011, issued May 29, 1990 and assigned to the present assignee. The disclosure of U.S. Pat. No. 4,930,011 is incorporated herein by reference. Kiewit's disclosed system includes small radio transmitters that broadcast uniquely coded identification signals to be detected by data collection equipment at monitored locations within retail establishments and homes.

The use of special physical identification devices, such as cards, limits a market researcher's ability to accurately measure a panelist's shopping behavior. In the first and third cases described above, a shopper will not be counted if he or she forgets to carry the identification card or radio transmitter. In the second example a shopper will not be identified if payment is made in cash rather than by personal check. An automatic identification system that could recognize people who had previously shopped at the store and that could log the frequency and temporal distribution of their shopping trips would be valuable for retail market research studies.

Identification methods that provide an input to a retail store's computer system or that can be used to correlate the panelist and with his or her purchases are particularly advantageous to market researchers.

A number of known prior art methods of partially automatic individual identification require active cooperation on the part of the person to be identified. Some of these, such as the measurement of characteristic features of the hand, as taught by Kondo in U.S. Pat. No. 4,206,441, or of the retina, as taught by Flom and Safin in U.S. Pat. No. 4,641,349, have proven to be useful for regulating access to secure areas. Partially automatic facial image recognition systems have been taught by Felix et al, in U.S. Pat. No. 4,449,189, who describe a personal access control system using a combination of speech recognition and an analysis of characteristic shapes of the speaker's mouth. Goldman, in U.S. Pat. No. 4,811,408, teaches the use of identification cards bearing at least one portion of the image indicia. Gotanda, in U.S. Pat. No. 4,712,103, teaches an identification card or key with a password, and requires a human operator to perform the face recognition portion of the identification work.

Daozheng Lu, in U.S. Pat. No. 5,031,228, issued Jul. 9, 1991 and assigned to the present assignee, discloses an image recognition system and method for identifying a pattern of a plurality of predetermined patterns in a video image. A plurality of feature image signatures are stored corresponding to each of the plurality of predetermined patterns. A universal feature image signature is stored that includes each of the stored feature image signatures. A predefined series of portions of a captured video image is sequentially compared with the universal feature image signature to identify matching portions. Each of the identified matching video image portions is compared with the stored feature image signatures to identify the predetermined pattern.

Daozheng Lu, in U.S. Pat. No. 4,858,000, issued Aug. 15, 1989 and assigned to the present assignee, discloses an image recognition method and system for identifying predetermined individual members of a viewing audience in a monitored area. A pattern image signature is stored corresponding to each predetermined individual member of the viewing audience to be identified. An audience scanner includes audience locating circuitry for locating individual audience members in the monitored area. A video image is captured for each of the located individual audience members in the monitored area. A pattern image signature is extracted from the captured image. The extracted pattern image signature is compared with each of the stored pattern image signatures to identify a particular one of the predetermined audience members. These steps are repeated to identify all of the located individual audience members in the monitored area. The disclosures of U.S. Pat. Nos. 4,858,000 and 5,031,228 are incorporated herein by reference.

SUMMARY OF THE INVENTION

It is an object of the present invention to provide a substantially automated system and method for collecting market research data that includes retail customer data together with retail sales transactional data.

It is another object of the present invention to provide a market research system and method that overcomes many of the disadvantages of prior art arrangements.

It is another object of the invention to provide an automatic face recognition system and method to identify a retail customer.

It is a more specific object of the invention to provide an automatic face recognition system and method that is capable of identifying a market research panelist in one of a plurality of monitored stores and to associate that panelist with the purchases made in that store.

It is a further object of the invention to provide an automatic face recognition system and method capable of identifying a retail customer with sufficient accuracy to be able to measure the shopping frequency at a given store, and that overcomes many of the disadvantages of prior art methods for identifying frequent shoppers in a retail store.

It is a further object of the invention to provide an automatic face recognition system and method capable of identifying a retail customer and of associating that customer's identification with identification provided by other means.

It is an additional object of the invention to provide an automatic face recognition system that can make a first identification of a shopper who is viewing a display or advertisement within a store and subsequently make a second identification of that shopper at the checkout counter, whereby a shopper's attentiveness to a display or advertisement may be correlated with purchases of products and with other demographic purchase-related variables.

It is yet a further object of the invention to provide an automatic face recognition system that can automatically update a set of stored recognition features whenever the system's attempt at recognizing a retail shopper is either confirmed or denied by some other standard identification method, such as manually matching the customer's signature on a check with the customer's signature on a check cashing identification card.

It is yet a further object of the invention to provide an automatic face recognition system that can track its own accuracy by comparing identifications made by the automatic system with those provided by other identification means.

In brief, the objects and advantages of the present invention are achieved by a market research system and method. A plurality of cooperating establishments are included in a market research test area. Each cooperating establishment is adapted for collecting and storing market research data. A computer system remotely located from the plurality of cooperating establishments stores market research data collected from the cooperating establishments. The collected market research data includes monitored retail sales transactions and captured video images of retail customers.

BRIEF DESCRIPTION OF THE DRAWING

The present invention together with the above and other objects and advantages may best be understood from the following detailed description of the embodiment of the invention illustrated in the drawing, wherein:

FIG. 4 is an electrical schematic and block diagram representation of an automatic face recognition system of the marketing research system of FIG. 1; and FIGS. 5-9 are flow charts illustrating logical steps performed by the monitoring unit of the marketing research system of FIG. 1 in accordance with the method of the present invention.

DETAILED DESCRIPTION OF THE PREFERRED EMBODIMENT

Figure 1:
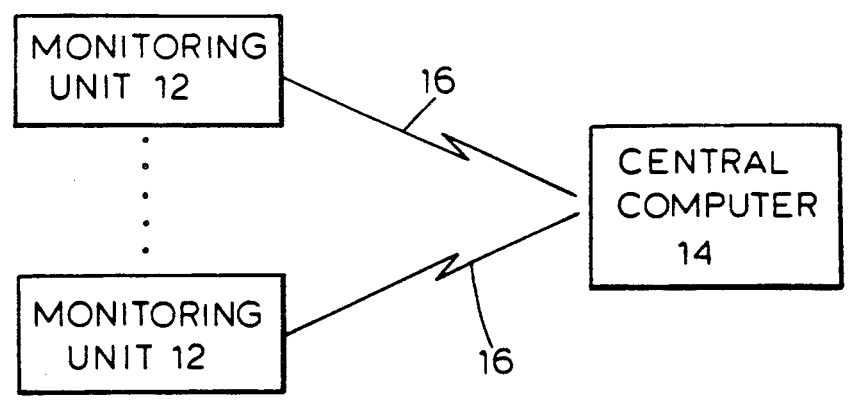
FIG. 1 is a block diagram of a market research system according to the present invention.

Referring now to the drawing, in FIG. 1 there is illustrated a marketing research system generally designated by the reference character 10. Market research system 10 includes a plurality of monitoring units generally designated by the reference character 12 coupled to a central computer 14 via communications links generally designated by the reference character 16. Each monitoring unit 12 monitors and stores selected market research data. Various conventional arrangements can be used for the communications links 16, for example, such as, via telephone lines connected to the public switched telephone network. Central computer 14 collects market research data from the cooperating establishment monitoring units 12.

Figure 2:
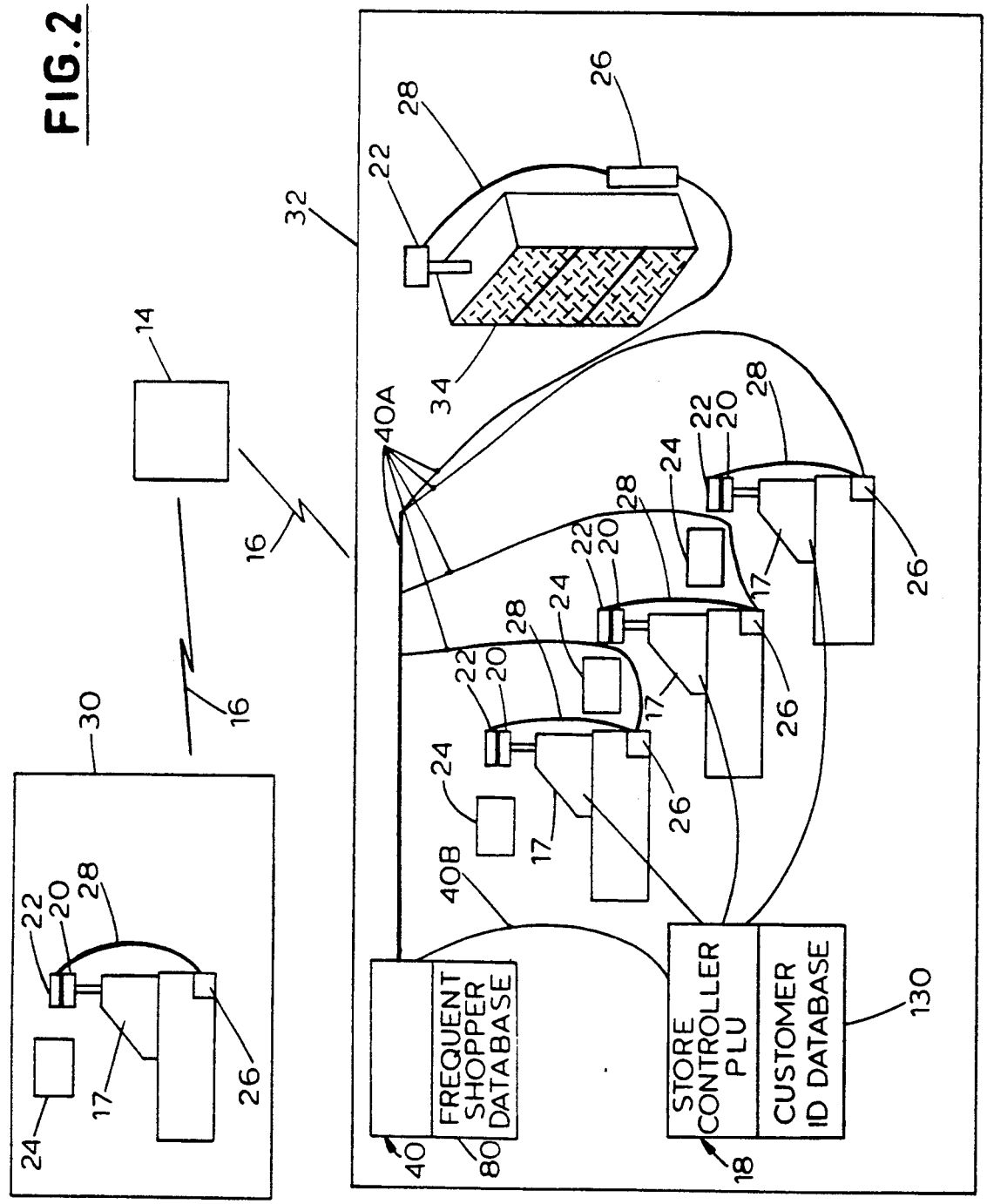
FIG. 2 is an electrical schematic and block diagram representation of a monitoring unit of the market research system of FIG. 1 to perform the method of the present invention.

Referring to FIG. 2, a retail store includes a point of sale (POS) terminal 17 typically connected to a store controller computer 18 which looks up the identity and price of each scanned item in a price lookup table (PLU) and then causes the scanned item identity and price to be displayed on a display module 20 visible to the shopper or retail customer. Alternately the price lookup function may be performed at the point of sale terminal 17 or by a remote store controller 18 depending on the particular point of sale system.

Each monitoring unit 12 includes at least one illuminator and camera module 22, preferably located adjacent the point of sale display 20, used to acquire images of the customer's face for recognition by a computer system while the customer's purchases are scanned and totalled. The preferred location of the illuminator and camera module 22 ensures that shopper is likely to occasionally look directly toward the camera in order to follow the course of the purchase transaction. A relatively featureless sheet 24 is used to provide a uniform background against which the image of the shopper's face can be more easily framed and identified. A local computer module 26 is attached by a cable 28 to the illuminator and video camera module 22.

In FIG. 2, a block 30 illustrates a small store having a single POS terminal 17 and a block 32 is illustrative of a larger store having a plurality of checkout POS terminals 17. In addition, an illuminator and camera module 22 and a local computer module 26 may be placed at other locations such as at a selected product display 34, for example, located at the end of an aisle where data can be collected to ascertain which shoppers and what fraction of shoppers were attracted to that display.

A store data collection computer 40 including a Frequent Shopper Database 80 is coupled to each of the local computer modules 26 at a line 40A and to the store controller computer 18 at a line 40B in block 32. Market research data including the identification of frequent shoppers and the collection of marketing research data associated with their purchase activities is coupled to the central office computer 14 from the store data collection computer 40. In block 30, market research data collected from the single POS terminal 17 is coupled to the central office data collection computer 14 from the local computer module 26. Retail sales transactional data can be collected by the market research system 10 of the invention by known data collection systems, such as disclosed by Daniel Jr., et al. in U.S. Pat. No. 4,972,504. The disclosure of U.S. Pat. No. 4,972,504 is incorporated herein by reference.

Figure 3:
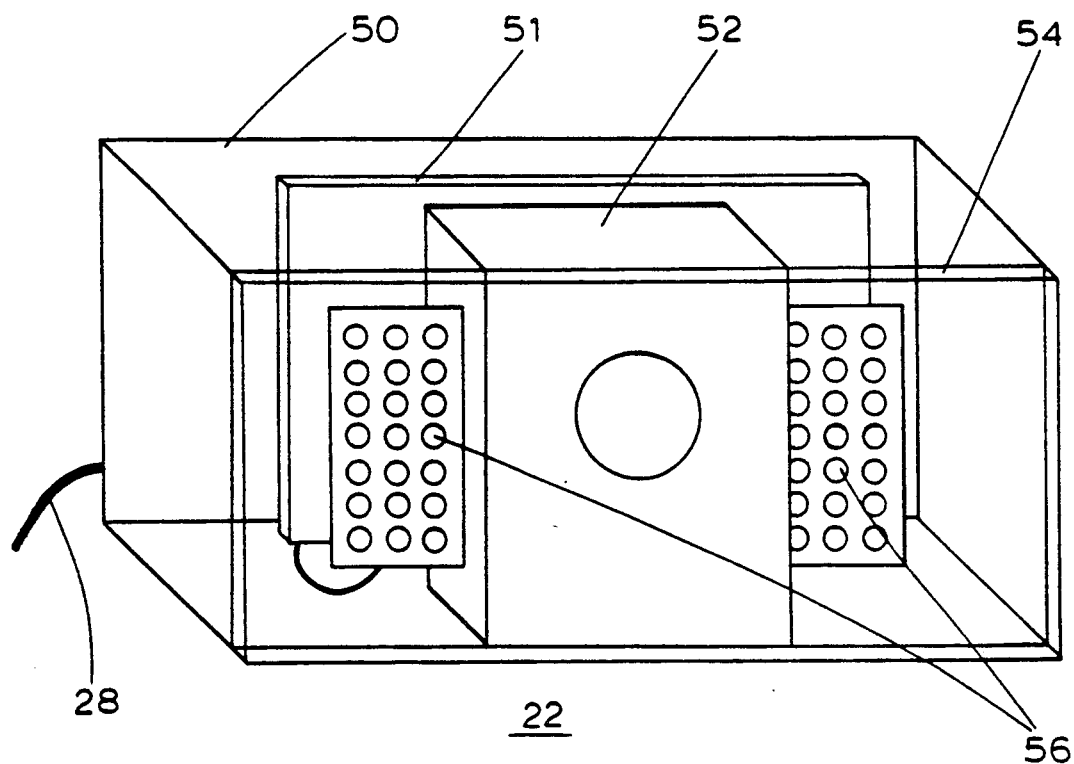
FIG. 3 is a perspective view of an illuminator and video camera module of the market research system of FIG. 1.

Referring to FIG. 3, the illuminator and video camera module 22 is shown in greater detail. The illuminator and video camera module 22 includes a housing 50 that contains a small video camera 52 such as the Hitachi Model VK- M10, which provides a CCD imager with a 324×246 pixel resolution. Video camera 52 is optimized for use in the near infrared portion of the spectrum or at wavelengths of 800–1000 nM, and is concealed from the shoppers' view by a plastic infrared filter 54. A covert infrared illuminator, preferentially comprised of an array of infrared light emitting diodes 56, is also mounted in the housing 50. Various wires in the cable 28 provide the module with electrical power and input commands from the local computer module 26, as well as conveying video images from the video camera 52 to a video frame grabber and buffers module 64 shown in the local computer module 26 in FIG. 4.

Since the location of the shopper near a checkout POS terminal 17 is fairly well constrained, it should be understood that the illuminator and video camera module 22 of the present invention can be simpler than the audience scanners taught by Lu in U.S. Pat. Nos. 4,858,000 and 5,031,228.

In order to provide adequate illumination while minimizing heat generated by the illuminator and camera module 22, the illuminator is controlled by the local computer module 26 and is used to illuminate the scene periodically when a transaction is in progress. If the ambient illumination at the checkout counter is sufficiently well controlled the use of the covert illuminators 56 may be avoided and the apparatus thereby simplified.

Referring to FIG. 4, the local computer module 26 used for image acquisition and operational control of the illumination and video camera module 22 is illustrated. Inputs and outputs of the local computer module 26 include a parallel port 60 that is used to send ON and OFF commands to the illuminator 56; a video input 62 that passes video signals from the video camera 52 to a video frame grabber and buffers block 64 of the module 26; and a serial port 66 that communicates with other computer modules 18, 40 within the store. Other inputs, such as a keyboard (not shown) and outputs, such as a display (not shown) may also be used with the local computer module 26 during installation or maintenance of the system as is known in the art.

A Model DT2853, made by Data Translation of Marlboro, Mass. can be employed for the frame grabber 64 used in the local computer module 26. The use of frame grabbers in similar systems is described by Lu in U.S. Pat. Nos. 4,858,000 and 5,031,228.

A central processing unit (CPU) 68 controls portions of the local computer module 26 by issuing appropriate commands via a bus 70, which preferably adheres to the ISA industry standard. A memory system 72 for storing program and market research operational data coupled to the bus 70 of the local computer module 26 includes two or more megabytes of RkM, a fixed disk drive used for program and data storage and a floppy disk drive used for installation and diagnostic functions. Various commercially available microprocessor devices having standard capabilities can be used for the CPU 68, for example, such as a 80386 high-performance 32-bit microprocessor device and an associated 80387 arithmetic co-processor manufactured and sold by Intel Corporation of Santa Clara, Calif.

In normal operation, the local computer module 26 commands the illuminator 56 to flash and subsequently commands the frame grabber 64 to acquire a frame of video taken during the flash, digitize the acquired video frame, and load the digitized video frame into RAM within the memory system 72. The length of ON time for the infrared illuminator 56 is preferentially set by the illuminator hardware, rather than by the computer 26. Once a frame or a set of frames of video is stored in RAM, the local computer module 26 proceeds with attempts to find and identify a shopper's face. Communication with the other computers 18, 40 in the store via the serial port 66 is commonly employed, for example, to access the Frequent Shopper Database 80 of feature sets corresponding to frequent shoppers for the store that is being monitored. In block 30 with market research data collected from the'single POS terminal 17, the Frequent Shopper Database 80 is provided with the single local computer module 26.

Collected shopper data stored in the memory 72 is combined with the collected POS retail sales transactional data. A modem (not shown) can be provided for communications with the central computer 14 via a corresponding communications link 16.

Figure 5:
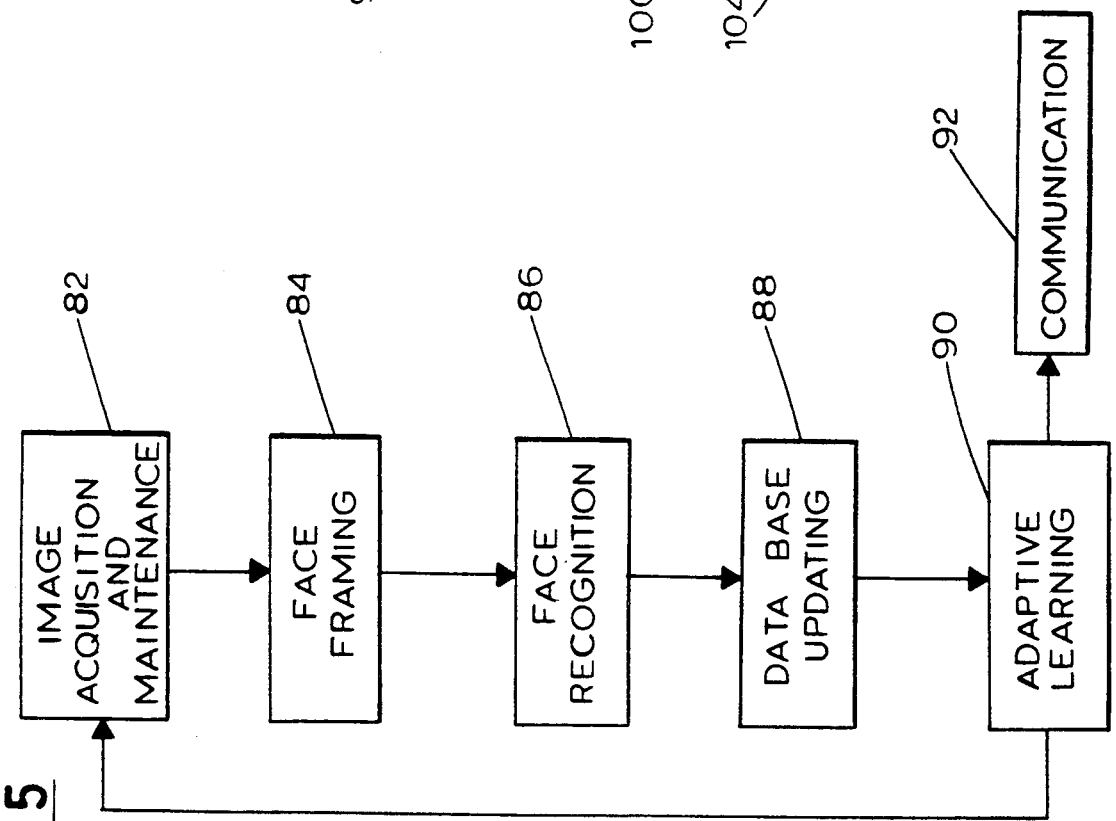

Referring to FIG. 5, there is shown a flow chart illustrating six major functional modules of logical operations performed by the monitoring unit 12 of the marketing research system 10. The sequential operations begin with image acquisition and maintenance as indicated at a block 82. The image acquisition and maintenance functional module 82 is illustrated and described with reference to FIG. 6. Next face framing sequential operations are performed as indicated at a block 84 and illustrated and described with reference to FIG. 7. Then face recognition sequential operations are performed as indicated at a block 86 and illustrated and described with reference to FIG. 8. Next data base updating and adaptive learning sequential operations are performed as indicated at blocks 88 and 90 and illustrated and described with reference to FIG. 9. A communication module as indicated at a block 92 is employed both to send data, for example, such as, a list of all frequent shoppers identified during a given day and the time of day corresponding to each identification, to other devices, such as an in-store data collection master computer 40 or a central office computer 14; as well as to receive operating and maintenance data and commands, for example, to have the local computer clock accurately set. Communication with a central office data collection computer 14 is described in greater detail in Daniel et al., U.S. Pat. No. 4,972,504.

Figure 6:
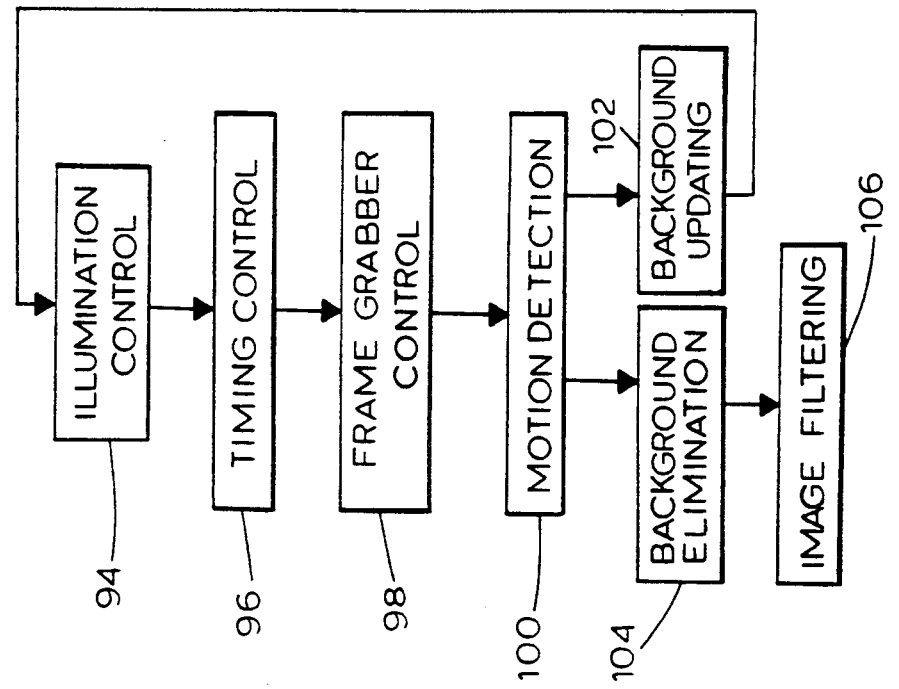

FIG. 6 provides a detailed presentation of the image acquisition and maintenance block 82 of FIG. 5. Attempts to obtain a facial image, for example, at the beginning of a checkout or retail sales transaction are conducted by first controlling the intensity and timing of the illumination, as shown in blocks 94 and 96 labelled ILLUMINATION CONTROL and TIMING CONTROL, respectively. Then a sequence of video frames is grabbed as indicated in a block 98 labelled FRAME GRABBER CONTROL. An image grabbed in block 98 is subtracted from the previous image to determine if motion has occurred as shown in a block 100 labelled MOTION DETECTION. When no motion is detected, for example, when the subtraction operation results in an image that has an intensity of less than some threshold value everywhere in the image plane, then the new image may be used to update the value of the background, as indicated at a block 102 labelled BACKGROUND UPDATING. Note that a background image may be initially defined and periodically rechecked during times when no face is expected to be in the camera scene, for example, when the checkout lane is closed, as is indicated by the point of sale terminal being turned off. If motion is detected in block 100, the background is subtracted from the input image to form a difference image, as shown in block 104 labelled BACKGROUND ELIMINATION. The difference image is then subjected to lowpass filtering as shown in block 106 labelled IMAGE FILTERING to remove much of the image noise, as is known in the art of image processing. Then the sequential steps continue with attempts to locate and identify the shopper's face.

Referring now to FIG. 7, once motion has been detected by the image acquisition and maintenance module 82, an attempt to locate a face to be identified is made by the face framing module 84. Shape analysis is used in block 108 labelled SHAPE ANALYSIS and then to approximately locate an image of a shopper's head as indicated at a block 110 labelled HEAD LOCATION. Shape analysis is taught by R. C. Gonzales and P. Wintz in "Digital Image Processing" 2nd ed., Addison and Wesley Publishing Company, 1987. since a shopper may not always have his or her head in a vertical position, the head tilt is determined as indicated at a block 112 labelled HEAD 2-D ORIENTATION. Then the head image is amplitude-averaged, sized, and oriented into a standard format as shown in block 114 labelled FACE IMAGE SIZE & INTENSITY NORMALIZATION.

Referring now to FIG. 8, there is illustrated the face recognition functional module block 86 of FIG. 5. First the three-dimensional orientation of the face is determined by the use of Eigenface analysis and face space theory as indicated at a block 116 labelled 3-D ORIENTATION DETECTION. The algorithms employed at block 16 may be better understood by reference to a number of published papers, such as: a) L. Strovich and M. Kirby, "Low Dimensional Procedure for the Characterization of no. 3, pp. 519-524, 1987; b) M. Kirby and L. Sirovich, "Application of the Karhuen-Loeve Procedure for the Characterization of the Human Face", Transactions on Pattern Analysis and Machine Intelligence, vol. 12, no. 1, 1990; and c) M. Turk and A. Pentland, "Eigenfaces for Recognition", Journal of Cognitive Neuroscience, vol 3, no. 1, pp. 71-86, 1991. Once the orientation of the facial image is established at block 116, features of the facial image may be extracted as indicated at a block 118 labelled FACE FEATURE EXTRACTION. The extracted features at block 118 are classified into a specific group according to the hierarchical representation of facial image features used to defined the Frequent Shopper Database 80 as indicated at a block 120 labelled FACE CLASSIFICATION. The input facial feature set is then compared with the relevant subset of all the facial feature sets in database 80 by using the Eigenface parameters to arrive at a quantitative estimate of the degree to which the newly acquired facial image matches an image already present in the database 80 as indicated at a block 122 labelled EIGENFACE RECOGNITION.

As is understood by those skilled in the data processing arts, the Frequent Shopper Database 80 may be physically resident on any one of a number of computers in the data collection system 10. In FIG. 2, for example, it is shown as being located in the in-store data collection computer 40. In a smaller store, shown schematically as 30 in FIG. 2, the Frequent Shopper Database 80 resides on the local computer module 26.

The database 80 may be initially defined or built by obtaining images of panel members in a standard setting, automatically extracting digital feature sets from those images by the same processes that are subsequently used for panelist identification as depicted in FIGS. 5-8, and storing those digital feature identification, for example, name, membership number in the database 80 at block 88 in FIG. 5. Alternately, the database 80 may be formed without providing individual retail customer identification by collecting shoppers' feature sets and using the collected feature sets to determine when one of those previously recognized shoppers buys something at the monitored store. The collected feature sets are then retained as long as the shopper continues to be re-recognized within some predetermined time period. In either event, the database 80 is updated with a record noting each recognition occurrence, as noted in block 88 in FIG. 5.

The frequent shopper database 80 is also preferentially updated by an adaptive learning process, shown at block 90 in FIG. 5, at each recognition. In this process, the results of the current recognition are combined with information in the database 80 to define a new standard feature set corresponding to the shopper who has just been identified. The adaptive learning process of block 90 thus accommodates the system to small changes in the appearance of the shopper, for example, as may occur from a change of hair style.

Referring to FIG. 9 in some cases, for example where a customer provides independent evidence of identity, the system 10 of the present invention provides both an increased level of certainty as to the customer's true identity, and a way of monitoring the performance of the automatic face recognition operations described above. A customer presents separate identification which is entered into the logical operations of the system 10 as indicated at a block 140 labelled INPUT SECOND IDENTIFICATION OPTION. For example, suppose a shopper presents a barcoded identification card bearing a signature to verify that he or she is allowed by the store to pay for purchases with a personal bank check. A clerk scans the identity card with the optical scanner associated with the POS terminal 17, so that the store computer system 18 can look up the particular customer in a Customer Identification Database 130 as indicated at a block 141 labelled LOOK UP IN CUSTOMER IDENTIFICATION DATABASE. Since the customer has now been identified twice, once by recourse to the Frequent Shopper Database 80 as indicated at a block 142 labelled FORMAT FREQUENT SHOPPER DATABASE, and once by recourse to the Customer Identification Database 130 at block 141, the two identifications can be compared as indicated at a block 143 labelled DOES IMAGE IDENTIFICATION .MATCH OTHER IDENTIFICATION? The logical comparison operation at block 143 can be performed in the system 10 as shown in FIG. 2 by passing results from the Frequent Shopper Database 80 to the store controller 18 via a suitable connection 40B between the two computers and then using software resident on the store controller 18.

If both identifications agree at block 143, this agreement can be noted, and taken as an indication of the accuracy of the automatic identification system. Also, as discussed above, then the new feature set can be used in adaptive learning module 88 to modify the standard recognition feature set in the frequent shopper database 80. If the two identification subsystems disagree in block 143, the store computer system 18 may alert the clerk of a need to verify the identity of customer as indicated at a block 144 labelled VERIFY OTHER IDENTIFICATION, for example, by comparing the signature on the scannable identity card with the signature on a tendered personal check. If the identity of the customer is thus verified, the clerk can input this datum to the computer system 18, which will interpret this as a failure of the automatic image recognition system. Then the new image feature set from the customer's face can be used in the adaptive learning process at a block 149 to improve the Frequent Shopper there previously with the new feature set. Alternately, if the clerk's verification of the customer's identification indicates that the automatic system was right, for example, if the shopper presented a stolen identification card this datum can also be entered into the computer system 40 as a measure of the accuracy of the image analysis system. Also, the system can provide an additional benefit of being able to prevent financial loss to the store that could occur if a stolen check cashing identification card were to be used.

Although it is expected that the greatest value of the present invention will arise from the ability to associate a frequent shopper's purchases with his or her identity in an unobtrusive manner, it should be noted that the system 10 also provides for a measurement of the degree of attention that a product display attracts in a store. This may be understood with reference to FIG. 2 of the drawing, where an image acquisition and recognition unit 22 is covertly placed at a product display 34. The unit 22 will acquire images of all shoppers who are deemed to pay at least a minimum amount of attention to the display, for example, all those who approach within a predetermined distance and look at the display for at least a predetermined time.

It should be noted that the product display portion of the system may operate in a slightly different way than the checkout counter portion of the system. Since shoppers can be visible from a product display at a great range of angles and distances, the image acquisition subsystem used for this application may be more sophisticated than that described in FIG. 3, and may be more similar to that taught by Lu in U.S. Pat. Nos. 4,858,000 and 5,031,228. Moreover, since frequent shopper identification is also done at checkout, it is not necessary to perform the entire identification process at the product display. Instead, facial images can then be acquired and translated into standard recognition feature sets as described above, and the standard feature sets can be temporarily retained in memory, for example, by the store data collection computer 40 for a period of one half hour for subsequent comparison with feature sets of shoppers who are identified during checkout at the POS terminal 17.

While the invention has been described with reference to details of the illustrated embodiments, these details are not intended to limit the scope of the invention as defined in the appended claims.

We claim:

1. A market research method for a marketing research system including a plurality of cooperating establishments in a market research test area; each said cooperating establishment adapted for collecting and storing market research data, said method comprising the steps of:
   monitoring retail sales transactions within each said cooperating establishment;
   periodically capturing a video image of a retail customer near a POS terminal within each said cooperating establishment;
   combining said monitored retail sales transaction data and said captured video image data; and
   transferring said combined data to a central computer for use by market researchers.

2. A market research method as recited in claim 1 further including the steps of:
   forming a digital facial feature set from a portion of said captured image corresponding to said retail customer's face,
   storing, in a computer memory, a plurality of said facial feature sets, each said facial feature set corresponding to a retail customer,
   storing with said facial feature set a reference time at which said facial feature set was formed.

3. A market research method as recited in claim 2 further including the steps of:
   capturing a current video image of said retail customer at a monitored point of sale,
   forming a current facial feature set from said current image,
   comparing said current facial feature set with said stored facial feature set,
   generating an identification record associated with a retail customer when said current facial feature set matches said stored facial feature set, and
   storing said identification record in a computer memory.

4. A market research method as recited in claim 1 further including the steps of:
   capturing a video image of a shopper near a predetermined product display.

5. Apparatus for identifying, at a monitored point of sale within a retail store, a person who is one of a preselected group of people, said apparatus comprising:
   a first identification subsystem including;
   computer means for storing a plurality of reference facial feature sets, each said reference facial feature set corresponding to one person of said preselected group of people,
   video camera means for capturing a current image of a person present at said monitored point of sale, image processing means for extracting a current facial image from said captured current image, for transposing said facial image into a standard setting and for extracting from said standardized facial image a current facial feature set, means for comparing said current facial feature set with said stored reference facial feature set to identify a match, thereby identifying said person currently present at said point of sale, means for generating and storing a first current identification record associated with said identified person, a second identification subsystem including;

means for receiving an input second identification associated with one person of said preselected group of people, and for generating a reference identification'data set, computer memory means for storing a plurality of said reference identification data sets, means for generating a second current identification record associated with a person when a reference identification data set corresponding to a received input second identification matches a stored reference identification data set, and means for comparing said first and said second current identification records.

6. An image recognition system for identifying a shopper at a plurality of monitored locations within a retail store and for measuring a reference time at which each identification occurs, said system comprising:

a plurality of image data acquisition subsystems each said subsystem comprising, means for capturing 8 video image, said captured video image including a facial image of a shopper, means for digitizing said video image and for extracting from said digitized image a digitized representation of said facial image, means for transposing said digitized representation into a standard setting, means for forming from said digitized representation a facial feature Set corresponding to a shopper, means for identifying a reference time for forming said facial feature set, means for forming an image record comprising, in combination, said facial feature set and said reference time corresponding to said facial feature set, and means for communicating said image record to an identification subsystem comprising;

means for storing a plurality of said image records, means for comparing a first said image record with a second said image record and for generating an identification record associated with a shopper when said first image record matches said second image record, and memory means for storing said identification record.

7. An image recognition system as recited in claim 6 wherein said monitored locations include a point of sale and a predefined product display.

8. A market research system for collecting data from a retail sales establishment, the retail sales establishment having at least one point-of-sale at which a point-of-sale terminal is located, the market research system comprising:

first means for monitoring retail sales transactions at the point-of-sale;

second means, located at the point-of-sale, for capturing a video image of a retail customer who is in the vicinity of the point-of-sale; and, third means, connected to the first and second means, for identifying the retail customer in the video image by automatically comparing the video image of the retail customer to a reference image and for storing data related to the retail sales transactions.

9. The market research system of claim 8 wherein the third means further includes:

means for extracting an input facial representation of the retail customer from the video image;

means for storing a reference facial representation of the retail customer; and, means for comparing the input facial representation with the reference facial representation in an effort to identify the retail customer.

10. The market research system of claim 9 further including means for storing other data with the reference facial representation of the retail customer, the other data including an identification of the retail customer and an identification of the retail sales establishment.

11. The market research system of claim 9 wherein the third means provides a first identification of the retail customer and wherein the market research system further includes:

means for receiving a second identification of the retail customer; and means for determining whether the first identification matches the second identification.

12. The market research system of claim 11 further including means, responsive to a match between the first and second identifications, for updating the reference facial representation based upon the input facial representation of the retail customer.

13. A market research system having, within a retail sales establishment, at least one point-of-sale at which a point-of-sale terminal is located and at least one product display, the market research system including:

first means for monitoring retail sales transactions at the point-of-sale;

second means, located at the product display, for capturing a video image of a retail customer who is in the vicinity of the product display; and, third means, connected to the first and second means, for determining the identity of the retail sales customer in the video image and for storing data related to the retail sales transactions.

14. The market research system of claim 13 wherein the third means further includes:

means for extracting an input facial representation of the retail customer from the video image;

means for storing a reference facial representation of the retail customer; and, means for comparing the input facial representation with the reference facial representation in an effort to identify the retail customer.

15. The market research system of claim 14 further including means for storing other data with the reference facial representation of the retail customer, the other data including an identification of the retail customer and an identification of the retail sales establishment.

16. The market research system of claim 14 wherein the third means provides a first identification of the retail customer and wherein the market research system further includes:

means for receiving a second identification of the retail customer; and, means for determining whether the first identification matches the second identification.

17. The market research system of claim 16 further including means, responsive to a match between the first and second identifications, for updating the reference facial representation based upon the input facial representation of the retail customer.

18. The market research system of claim 13 wherein the second means captures a first video image of the retail customer, wherein the market research system further includes fourth means, located at the point-of-sale, for capturing a second video image of the retail customer when the retail customer is in the vicinity of the point-of-sale, and wherein the third means is connected to the fourth means for determining the identity of the retail sales customer in the first and second video images.

19. The market research system of claim 18 wherein the third means further includes:

means for extracting input facial representations of the retail customer from the first and second video images;

means for storing a reference facial representation of the retail customer; and, means for comparing the input facial representations with the reference facial representation in an effort to identify the retail customer.

20. The market research system of claim 19 further including means for storing other data with the reference facial representation of the retail customer, the other data including an identification of the retail customer and an identification of the retail sales establishment.

21. The market research system of claim 19 wherein in the third means provides a first identification of the retail customer and wherein the market research system further includes:

means for receiving a second identification of the retail customer; and means for determining whether the first identification matches the second identification.

22. The market research system of claim 21 further including means, responsive to a match between the first and second identifications, for updating the reference facial representation based upon at least one of the input facial representations of the retail customer.

* * * * *

UNITED STATES PATENT AND TRADEMARK OFFICE
CERTIFICATE OF CORRECTION

PATENT NO.   :   5,331,544
DATED        :   July 19, 1994
INVENTOR(S)  :   Daozheng Lu, David A. Kiewit, Jia Zhang It is certified that error appears in the above-identified patent and that said Letters Patent is hereby corrected as shown below:

Column 6, line 12, "RkM" should be --RAM--.

Column 6, line 37, "the'single" should be -- the single--.

Column 7, line 45, " since" should be -- Since--.

Column 7, line 59, "16" should be --116--.

Column 11, line 18, claim 5, "identification'data" should be --identification data--.

Column 11, line 34, claim 6, "8" should be --a--.

Column 11, line 42, "Set" should be --set--.

Signed and Sealed this

Eleventh Day of October, 1994

Attest:

BRUCE LEHMAN

*Attesting Officer*          *Commissioner of Patents and Trademarks*